UNITED STATES PATENT OFFICE.

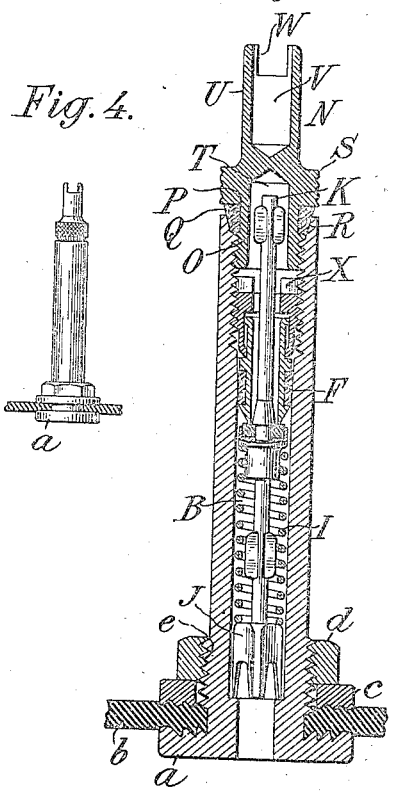
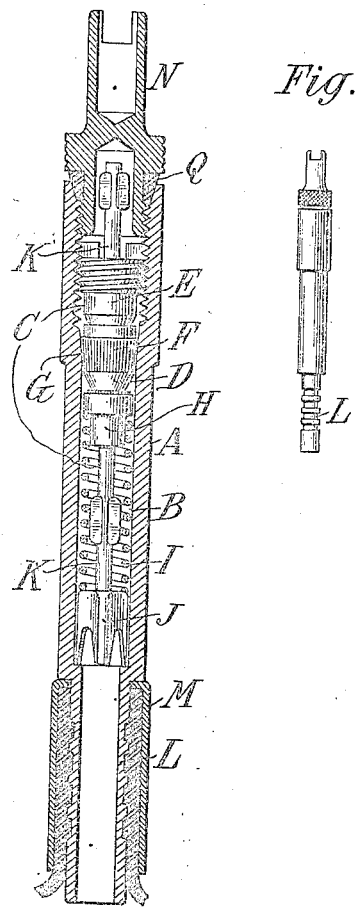
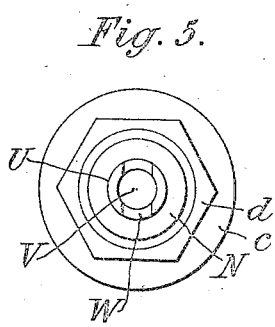

HENRY PHILLIP KRAFT, OF RIDGEWOOD, NEW JERSEY.

TIRE OR OTHER VALVE.

1,302,380.

Specification of Letters Patent.

Patented Apr. 29, 1919.

Application filed July 16, 1915. Serial No. 40,204.

*To all whom it may concern:*

Be it known that I, HENRY PHILLIP KRAFT, a citizen of the United States of America, residing in Ridgewood, in the county of Bergen and State of New Jersey, U. S. A., have invented certain new and useful Improvements in Tire or other Valves, of which the following is a specification.

This invention relates to inflation valves, and aims to provide certain improvements therein.

The invention is particularly directed toward valves for bicycles or other small vehicles in which the valve extends from the tire or inner tube inwardly through the rim. In certain types of bicycles, particularly in racing bicycles and those of lighter weight, there is a tendency to reduce the width of the rim to the smallest possible proportions, the tire being usually correspondingly reduced in diameter. The standard tire valve of the Schrader type comprises a cylindrical member or casing having a valve chamber within it of about the same length as the casing and designed to receive the standard operating parts of the valve, usually known as the "valve insides." These valve insides are already reduced to the minimum size, and for this reason it is impractical to make them smaller. Furthermore, it is desirable, for purposes of interchangeability, that the standard valve insides be capable of fitting the smallest forms of bicycle valve. The bicycle valve casings have usually been adapted to fit within a rubber cot which is molded upon the tire or tube, the casing preferably having grooves or ridges to assist in securing a tight joint between the cot and casing. As thus constructed it is difficult, if not impossible, to decrease the diameter of the valve, and the hole through the rim must be of sufficient diameter to permit not only the passage of the valve, but of the surrounding cot. A hole of this size has been found to detrimentally weaken the rim, and the principal object of the present invention is to provide a construction of valve which will permit of the use of a much smaller hole through the rim while at the same time permitting the use of the standard valve insides. According to the present invention, as applied to so-called cot valves, the valve casing is provided with an extension which is designed to enter the cot while the body of the valve, which incloses the valve insides, projects beyond the cot so that the diameter of the main part of the valve casing is not increased by the thickness of the walls of the cot. This enables me to materially reduce the size of the hole through the rim. In bicycle valves, whether of the cot type or "shoe" type, the casing is provided with a valve cap designed to close its end and check any leakage which may possibly occur through the valve insides, and such cap has uniformly been provided with interior threads adapted to screw on exterior threads formed on the outer end of the valve casing. This also has increased the diameter of the valve when the cap was in place, and the use of such a cap in connection with the present device would prevent the passage of the valve through the rim, unless the cap was removed. The present invention, therefore, also includes a novel form of cap of small exterior diameter, preferably not exceeding the diameter of the valve, and preferably provided with an external packing which is tapered and is adapted to be forced against an internal tapered seat formed at the top of the valve casing, means being provided within the cap for accommodating the deflating pin of the valve.

Referring to the drawings which illustrate certain embodiments of the invention, Figure 1 is a diametrical section of a cot valve embodying the present invention.

Fig. 2 is an elevation of Fig. 1, showing the actual size of the valve.

Fig. 3 is a diametrical section of a shoe valve embodying the present invention.

Fig. 4 is an elevation of Fig. 3, and

Fig. 5 is a plan view of Fig. 3.

Referring first to Figs. 1 and 2 of the drawing, let A indicate the valve shell which has formed within it a chamber B designed to receive the valve insides C. The type of inside shown comprises a seat member D held in place by a screw-threaded plug E swiveled to the seat member, the latter carrying a packing F which is adapted to make a tight joint with a tapered shoulder G on the interior of the casing. The valve proper is lettered H, and is normally held closed by a spring I, the lower end of which bears against a spring holder J, and the upper end of which presses against the underside of the valve proper H. Extending through the plug E, seat F, valve proper H, spring I and spring holder J, is a pin K, the upper end of which projects slightly above the top of the valve casing so that the valve may be pressed down for deflating purposes or may be opened by a gage for the purpose of ascertaining the pressure within the tire. The walls of the casing A are reduced as much as possible in thickness, consistent with safety. Formerly, these walls have been provided with corrugations, and the rubber tube or cot which connects the valve with the tire or inner tube has been extended around the casing. This necessitates a considerable diameter of hole in the rim through which the valve may be passed.

According to the present invention, instead of securing the cot to the casing A, I form an extension L at the bottom of the casing, which extension may be of considerably reduced diameter, since it does not contain the valve insides. This reduction in diameter permits the use of a rubber cot on the tire or tube, of smaller diameter than those heretofore used, with the result that the size of the hole through the rim may be very considerably diminished. In the construction shown in Figs. 1 and 2, the external diameter of the cot is substantially equal to the external diameter of the valve casing. The cot may be fastened to the extension L in any suitable way, as by clamping the ferrule M around it, as shown in Fig. 1.

It is also very desirable that the valve shall be capable of being passed through the rim when the cap is in place. This facilitates the operation of applying and removing the tire, and prevents the ingress of cement, dust, etc., while the valve is being passed through the hole in the rim. In prior constructions the valve has been screwed on the exterior of the casing and has been of such diameter to require a hole of considerable size to permit its passage through the rim.

According to the present invention, I provide a novel construction of cap N. In the construction shown, the cap is formed with a lower portion O designed to enter the interior of the casing, the portion O being screw-threaded for this purpose to engage the screw-threads of the casing. Above the screw-threaded portion is preferably formed an annular groove P which is adapted to receive a packing Q, the exterior face of which is tapered, as shown, and is adapted to seat against a tapered face R formed on the interior of the upper end of the valve casing. The grasping portion S of the cap preferably constitutes the upper wall of the slot P, and such grasping portion may have an exterior diameter which is preferably no larger than the diameter of the casing.

The cap is provided on its underside with a recess T which is adapted to receive the end of the valve pin K so that when the cap is screwed on the valve will not be depressed or unseated. The upper part of the cap is preferably cylindrical, as shown at U, and is formed with a recess V designed to receive the valve pin Q when the cap is reversed, so as to permit the engagement of the slot W or other screw-driver provision on the cap with the rib X or other screw-driver provision on the plug E, whereby the cap may be used as a tool to insert and remove the plug.

Figs. 3, 4 and 5 illustrate the invention as applied to a shoe valve in which the valve has a shoe or flange a at its bottom, against which the tube or tire b is clamped, as best seen in Fig. 3. For this purpose a ring washer c is preferably employed, which is pressed downwardly by a nut d which engages a thread e formed at the lower part of the valve casing.

In operation, when the cap is screwed down its tapered packing engages the tapered seat formed on the top of the casing, and a tight joint is made without danger of depressing the valve pin. At the same time in this construction the interior threads of the casing approach the top thereof closely enough to permit the insertion of the ordinary pump coupling nipple, which is adapted to screw onto the threads of the casing. Sufficient metal is also left at the top of the valve casing to secure a proper seat for the pump coupling packing, whereby a tight joint may be made between the casing and the pump tube.

While I have shown and described several forms of the invention, it will be understood that I do not wish to be limited thereto, since various changes may be made therein without departing from the spirit of the invention.

What I claim is:—

1. In combination, a valve casing, and a cap, said casing having a tubular body portion and a foot or attaching portion below or beyond said body portion, said body portion having a deep bore therein extending inwardly from its outer end, and terminating in advance of the beginning of said foot portion, and valve insides adapted to be received in said bored body portion from its outer end, said insides comprising a screw-threaded plug and said body portion being screwthreaded internally considerably inward from the outer end, with which screw-threads the screwthreaded plug is adapted to engage, said foot portion having an external diameter less than the diameter of said body portion, and having an internal bore in prolongation of and of less diameter than the bore of said body portion, said cap having a screwthreaded portion adapted to engage the internal threads in said body portion above said plug, and being of no greater diameter than the external diameter of said body portion.

2. In combination, a valve casing, and a cap, said casing having a tubular body portion and a foot or attaching portion below or beyond said body portion, said body portion having a deep bore therein extending inwardly from its outer end, and terminating in advance of the beginning of said foot portion, and valve insides adapted to be received in said bored body portion from its outer end, said insides comprising a screwthreaded plug and said body portion being screwthreaded internally considerably inward from the outer end, with which screwthreads the screwthreaded plug is adapted to engage, said foot portion having an external diameter less than the diameter of said body portion, and having an internal bore in prolongation of and of less diameter than the bore of said body portion, said cap having a screwthreaded portion adapted to engage the internal threads in said body portion above said plug, and being of no greater diameter than the external diameter of said body portion, said valve casing being in one piece and having a substantially smooth threadless exterior surface.

In witness whereof, I have hereunto signed my name in the presence of two subscribing witnesses.

HENRY PHILLIP KRAFT.

Witnesses:
 E. G. MEYERS,
 FRED WHITE.